United States Patent [19]

Utton et al.

[11] Patent Number: 5,004,354
[45] Date of Patent: Apr. 2, 1991

[54] HEAT TRANSFER MEASUREMENT

[75] Inventors: Donald B. Utton, Altrincham; Stephen R. Windebank, Brooklands, both of England

[73] Assignee: NNC Limited, England

[21] Appl. No.: 389,128

[22] Filed: Aug. 3, 1989

[30] Foreign Application Priority Data

Aug. 16, 1988 [GB] United Kingdom ............... 8819442

[51] Int. Cl.$^5$ ..................... G01K 17/10; G01K 17/02
[52] U.S. Cl. ..................................... 374/29; 374/40; 376/244; 376/247
[58] Field of Search ............... 374/29, 30, 35, 39, 374/40, 41; 376/247, 244

[56] References Cited

U.S. PATENT DOCUMENTS

| | | | |
|---|---|---|---|
| 3,935,063 | 1/1976 | Dunckel | 376/282 |
| 3,958,627 | 5/1976 | Edelstein | 165/104.26 |
| 4,067,237 | 1/1978 | Arcella | 374/113 |
| 4,482,006 | 11/1984 | Anderson | 374/41 |
| 4,618,266 | 10/1986 | Feller | 374/41 |
| 4,750,551 | 6/1988 | Casey | 376/367 |
| 4,773,023 | 9/1988 | Giardina | 374/40 |

FOREIGN PATENT DOCUMENTS

| | | | |
|---|---|---|---|
| 0198735 | 11/1983 | Japan | 374/29 |
| 0007232 | 1/1984 | Japan | 374/29 |
| 0020826 | 2/1984 | Japan | 374/35 |
| 0071625 | 4/1988 | Japan | 374/35 |
| 0474708 | 10/1975 | U.S.S.R. | |
| 1528953 | 10/1978 | United Kingdom | 374/30 |

*Primary Examiner*—William A. Cuchlinski, Jr.
*Assistant Examiner*—Diego F. F. Gutierrez
*Attorney, Agent, or Firm*—Kirschstein, Ottinger, Israel & Schiffmiller

[57] ABSTRACT

Heat transfer between a surface and an environment, such as a steam/air mixture in a pressure vessel, is determined by directing heat transferred to the surface to a location away from the environment by use of a heat pipe. The heat content of the working fluid of the heat pipe is determined by causing a fluid to flow through a jacket encircling the condensation part of the heat pipe and measuring the mass flow of the fluid and the temperature change. The method is particularly useful in determining heat transfer coefficients for use in safety analysis for pressurized water reactor power stations.

22 Claims, 1 Drawing Sheet

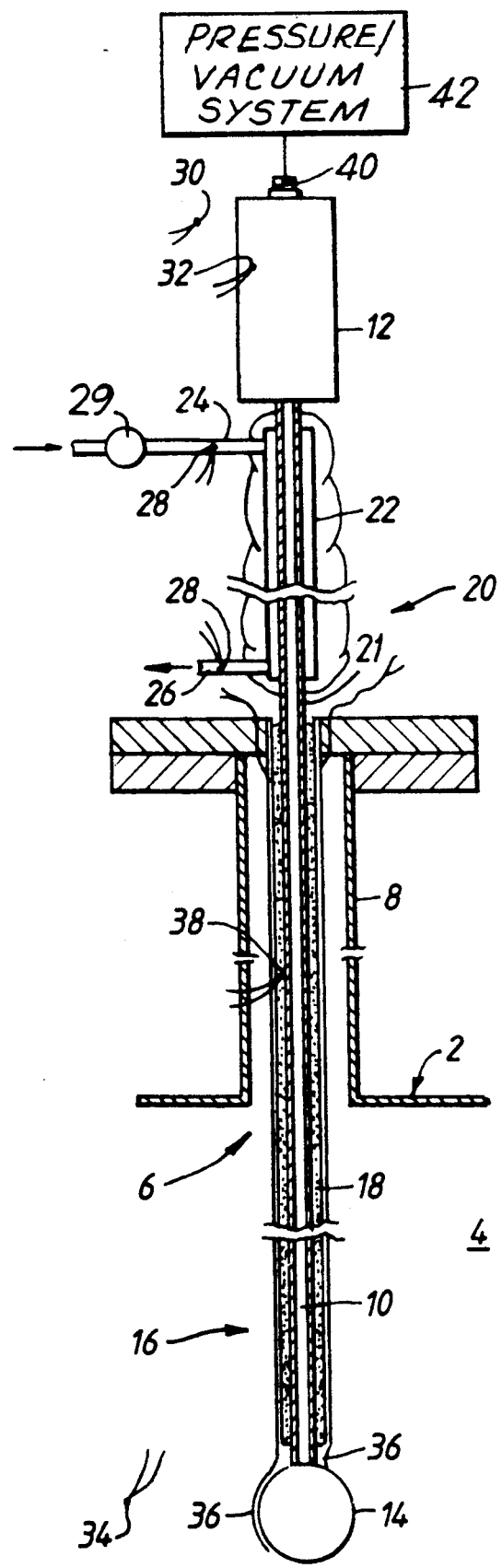

HEAT TRANSFER MEASUREMENT

BACKGROUND OF THE INVENTION

1. Field of the Invention

This invention relates to the measurement of heat transfer occurring at a surface, and is applicable particularly, but not exclusively, to the measurement of condensation heat transfer coefficients in nuclear reactors.

2. Description of Related Art

In the very unlikely event of a failure causing a loss of coolant in a pressurised water reactor, steam might be released into the vessel, resulting in a pressurised mixture of steam and air which could affect the operation of safety equipment in the vessel. The temperature response of affected equipment is dependent upon the local heat transfer coefficients, which, in turn, are dependent on the total pressure within the vessel, the magnitude of local gas velocities and the ratio of mass of air to mass of steam.

It is necessary to be able to measure heat transfer coefficients as a function of these three parameters.

Various devices and methods have previously been proposed for effecting such measurements. These have included measurement of the transient thermal response of solid metal bodies, but this provides only transient information. Heat flux meters have been embedded in the pressure vessel walls, but the positions of such meters are restricted. Measurements have also been carried out using water-cooled metal bodies, but the shape and dimensions of the condensing surface are limited. Furthermore, none of these known techniques allows adjustment of the surface temperature on which condensation takes place.

SUMMARY OF THE INVENTION

It is as object of the present invention to provide an improved method and apparatus for measuring heat transfer.

According to one aspect of the present invention there is provided a method of measuring heat transfer, comprising exposing a surface to an environment in which heat transfer takes place between the surface and the environment by condensation and/or convection and/or radiation mechanisms; transporting heat transferred to the surface to a location external to said environment by means of the working fluid of a heat pipe; and measuring the heat content of the working fluid at said external location.

The surface may be constituted by an element which is thermally coupled to an evaporator section of the heat pipe, or it may be constituted by a surface of the evaporator section of the heat pipe.

The heat pipe is preferably of the variable-conductance type such that the operating temperature of the exposed surface can be selectively varied.

A condenser section of the heat pipe may conveniently be in heat exchange relation with a flowing fluid to which the heat absorbed by the working fluid in the evaporator section is transferred. By measuring the mass flow rate of the flowing fluid and the temperature increase it undergoes as a result of coming into heat exchange relation with the working fluid, the heat content of the working fluid can be calculated. From this and from a knowledge of the temperature difference between the exposed surface and the temperature of the environment to which it is exposed and also the area of the exposed surface, the heat transfer coefficient can then be determined.

According to another aspect of the present invention there is provided apparatus for measuring heat transfer within a vessel enclosing an environment in which exposed surfaces are subject to heat transfer by condensation and/or convection and/or radiation mechanisms, the apparatus comprising a heat pipe having an evaporator section and a condenser section, the heat pipe being arranged to extend partway into the vessel so that the evaporator section is within the vessel and the condenser section is external to the vessel, whereby heat flux is transmitted from said environment to the working fluid of the heat pipe; and means for measuring the heat content of the working fluid at a location external to the vessel.

BRIEF DESCRIPTION OF THE DRAWING

An embodiment of the invention will now be described, by way of example only, with reference to the accompanying drawing the sole FIGURE of which is a schematic view of a heat pipe arrangement for use in the measurement of the condensation heat transfer coefficient at a surface exposed to the environment within a pressurised vessel containing a mixture of steam and air.

DETAILED DESCRIPTION OF THE PREFERRED EMBODIMENT

Referring to the drawing, there is shown a part 2 of a wall of a pressurised vessel 4 containing a mixture of air and steam. For the measurement of condensation heat transfer coefficients within the vessel, a heat pipe assembly 6 is partially inserted into the vessel via a suitable penetration 8. The heat pipe assembly 6 is of the variable conductance type and comprises a central heat pipe 10 formed of, for example, copper, enclosing a vapourisable substance, such as water. The assembly 6 is connected to a reservoir 12 which contains non-condensable gas, such as nitrogen, from which the heat pipe 10 is filled. The heat pipe 10 terminates at its lower end in a thermally-conductive body 14 which is exposed to the steam/air mixture in the vessel 4. The lower end 16 of the heat pipe 10 acts as an evaporator section in which the heat absorbed by the body 14 serves to vapourise the vapourisable substance to produce a working fluid (e.g. steam in the case where the vapourisable substance is water) which flows upwardly along the heat pipe 10.

Part of the length of the heat pipe 10, i.e. that section of the heat pipe which lies within the vessel 4 and the penetration 8, is enclosed within a thermally insulating jacket 18, so as to provide a substantially adiabatic section over this part of the heat pipe. The section 20 of the heat pipe which lies outside the vessel 4 and the penetration 8 acts as a condenser section in which the water or other vapourisable substance undergoes a phase change back to the liquid state. The liquid travels back to the evaporator section 16 of the heat pipe 10. The inner surface of the heat pipe 10 may have a wick 21 attached thereto to facilitate transport of the condensate back to the lower end of the heat pipe 10.

The condenser section 20 of the heat pipe 10 is enclosed within an insulated coolant jacket 22 having an inlet 24 and an outlet 26, each provided with thermocouples 28 or other sensors for measuring the rise in temperature of the coolant, e.g. water, as it flows from the inlet 24 to the outlet 26. Means 29 is also provided for measuring the mass flow rate of the coolant through the jacket 22. Various other thermocouples (or alternative temperature sensors) are provided for measuring ambient temperature (sensor 30), the reservoir temperature (sensor 32), saturation temperature or alternatively steam temperature within the vessel (sensor 34), the temperature of the body 14 (sensors 36) and the temperature of the heat pipe 10 (sensor 38). The leads of the sensors 34, 36 and 38 are all routed to a measuring instrument or instruments (not shown) external to the vessel 4. The sensor 34 is arranged to measure actual steam temperature or saturation temperature according to whether the condensation heat transfer coefficient with respect to the former or the latter is required to be determined.

In use, heat transfer by condensation takes place at the surface of the body 14 (which may, for example, comprise a copper disc). This heat is transported by the working fluid along the adiabatic section of the heat pipe 10 to a location external to the vessel 4 where heat transfer occurs between the working fluid and the coolant flowing through the jacket 22. The heat arriving at the condenser section 20 can be calculated from the measurement of mass flow rate and temperature rise (i.e. the difference in temperature at the inlet 24 and the outlet 26). The condensation heat transfer coefficient can then be calculated from a knowledge of the exposed area of the body 14 and the difference in temperature registered by the sensors 34 and 36. The coefficient may be measured for different temperatures of the body 14 by varying the pressure of the non-condensable gas filling the heat pipe, e.g. by way of a suitable fitting 38 at the top of the reservoir 16.

With the heat pipe at nominally constant pressure, the use of the non-condensable gas enables the evaporator section to be held at a constant temperature over a wide range of heat inputs. With the heat pipe operating under steady state conditions, there is an interface between the vapour and the non-condensable gas at some point within the condenser section 20. An increase in heat input at the evaporator section will result in an increase in saturation vapour temperature, and with it an increase in vapour pressure. This will cause the gas interface to recede, thereby exposing more condensing surface. The volume of the reservoir 16 above the condenser section is designed to be large compared with the heat pipe volume. Hence, a small change in pressure will produce a significant movement of this interface, thereby maintaining the heat pipe at a substantially constant working temperature.

The non-condensable gas enables the working pressure, and therefore the temperature, of the heat pipe to be set, using an external pressure/vacuum system 42 connected to the fitting 40 at the top of the heat pipe.

Setting the non-condensable gas pressure determines the vapour pressure and therefore the saturation temperature of the vapour. As the evaporator is in excellent thermal contact with the vapour its temperature may be varied by adjusting the non-condensable gas pressure.

The invention hereinbefore described has the following advantages:

(i) the use of a heat pipe allows remote measurement of condensation heat flux and hence heat transfer coefficient;

(ii) the use of a heat pipe eliminates the need for the introduction of active instrumentation at the location of the condensing surface in the hostile environment of the pressure vessel;

(iii) the surface temperature at which condensation heat transfer is measured can be readily adjusted. This can be effected by choice of working fluid and/or pressure setting of the non-condensable gas;

(iv) the use of the heat pipe principle ensures that the temperature of the measurement surface is independent of the incident heat flux and hence the magnitude of the heat transfer coefficient; and (v) adjustment of the position and orientation of the heat transfer surface can easily be effected.

The preferred form of the heat pipe is described above with water as the working fluid and nitrogen as the non-condensable gas. Other combinations of working fluid and non-condensable gases can be used to operate in other temperature ranges. The copper disc can be replaced by other bodies of known thermal characteristics. The dimensions of the heat pipe and the choice of coolant for the condenser section can be selected to suit particular applications.

The invention may clearly be used for measuring heat transfer in other applications besides the nuclear reactor embodiment described above.

We claim:

1. A method of measuring a heat transfer coefficient, comprising the steps of: exposing a surface having a temperature to an environment having a different temperature and in which heat transfer takes place between the exposed surface and the environment by at least one of condensation, convection, and radiation mechanisms, the exposed surface having a predetermined area; transporting heat transferred to the exposed surface to a location external to said environment by passage of a working fluid having a heat content along a heat pipe; measuring the heat content of the working fluid at said external location; determining a temperature difference between the temperature of the exposed surface and the temperature of the environment; and determining the heat transfer coefficient from said heat content, said temperature difference and said predetermined area.

2. A method as claimed in claim 1, wherein the surface is provided by an element which is thermally coupled to an evaporator section of the heat pipe.

3. A method as claimed in claim 2, wherein the element comprises a body of thermally-conductive material attached to the heat pipe.

4. A method as claimed in claim 1, wherein said exposed surface is the surface of an evaporator section of the heat pipe.

5. A method as claimed in claim 1, wherein a mass flow rate and a temperature change of a flowing fluid in heat exchange relation with said working fluid are measured to determine the heat content of the working fluid.

6. A method as claimed in claim 1, wherein the environment comprises a mixture of steam and air in a pressurized vessel.

7. A method of measuring a heat transfer coefficient, comprising the steps of: exposing a surface having a temperature to an environment having a different temperature and in which heat transfer takes place between the exposed surface and the environment by at least one of condensation, convection, and radiation mechanisms, the exposed surface having a predetermined area; transporting heat transferred to the exposed surface to a location external to said environment by passage of a working fluid having a heat content along a heat pipe; bringing a flowing fluid into heat exchange relation with the working fluid; measuring a mass flow rate and a temperature change of the flowing fluid to determine the heat content of the working fluid; determining a temperature difference between the temperature of the exposed surface and the temperature of the environment; and determining the heat transfer coefficient from said heat content, said temperature difference and said predetermined area.

8. Apparatus for measuring a heat transfer coefficient within a vessel enclosing an environment having a temperature and in which an exposed surface of predetermined area and having a different temperature is subject to heat transfer by at least one of condensation, convection, and radiation mechanisms, the apparatus comprising: a heat pipe including a working fluid having a heat content, an evaporator section and a condenser section, the heat pipe extending partway into the vessel so that the evaporator section is within the vessel and the condenser section is external to the vessel, whereby heat flux is transmitted from said environment to the working fluid; means for measuring the heat content of the working fluid at a location external to the vessel; and means for determining a temperature difference between the temperature of the exposed surface and the temperature of the environment; said heat transfer coefficient being determined from said heat content, said temperature difference and said predetermined area.

9. Apparatus as claimed in claim 8, wherein said exposed surface comprises an element which is thermally coupled to the evaporator section of the heat pipe.

10. Apparatus as claimed in claim 9, wherein the element comprises a body of thermally-conductive material attached to the heat pipe.

11. Apparatus as claimed in claim 10, wherein said element comprises a copper disc.

12. Apparatus as claimed in claim 8, wherein the exposed surface comprises the surface of the evaporator section of the heat pipe.

13. Apparatus as claimed in claim 8, comprising means to conduct a flowing fluid into heat exchange relation with the condenser section of the heat pipe.

14. Apparatus as claimed in claim 13, wherein said conducting means comprises a jacket encircling the condenser section, through which jacket the flowing fluid passes.

15. Apparatus as claimed in claim 13, comprising means for measuring a mass flow rate of the flowing fluid and an increase in temperature experienced by the flowing fluid flowing through the jacket.

16. Apparatus as claimed in claim 8, wherein the heat pipe is of the variable conductance type such that the operating temperature of the exposed surface can be selectively varied.

17. Apparatus as claimed in claim 8, wherein a wick is provided at the inner surface of the heat pipe.

18. Apparatus as claimed in claim 8, wherein a thermally-insulating jacket encircles a section of the heat pipe within the vessel to provide a substantially adiabatic region.

19. Apparatus as claimed in claim 8, wherein the heat pipe is filled with a non-condensable gas.

20. Apparatus as claimed in claim 19, wherein the gas is nitrogen.

21. Apparatus as claimed in claim 19, including a reservoir for containing said gas.

22. Apparatus as claimed in claim 19, including means for varying gas pressure in the heat pipe.

* * * * *